United States Patent [19]

Funai et al.

[11] Patent Number: 4,819,110
[45] Date of Patent: Apr. 4, 1989

[54] DISK DRIVE HEAD ACTUATOR AND MOUNTING ARRANGEMENT THEREFOR

[75] Inventors: Kiyoshi Funai; Tetsu Yamamoto; Nobuaki Maeda; Hiroshi Imai; Kouichi Yoshioka, all of Hyogo, Japan

[73] Assignee: Mitsubishi Denki Kabushiki Kaisha, Tokyo, Japan

[21] Appl. No.: 924,628

[22] Filed: Oct. 29, 1986

[30] Foreign Application Priority Data

Nov. 18, 1985 [JP] Japan .................................. 60-259086
Mar. 11, 1986 [JP] Japan .................................. 61-55457

[51] Int. Cl.$^4$ ............................ G11B 3/06; G11B 5/48
[52] U.S. Cl. ................................... 360/106; 360/78.12
[58] Field of Search ............................ 360/86, 97–98, 360/104–106, 133

[56] References Cited

U.S. PATENT DOCUMENTS

| | | | |
|---|---|---|---|
| 3,886,595 | 5/1975 | Swaim et al. | 360/106 |
| 4,263,629 | 4/1981 | Hatch | 360/98 |
| 4,331,991 | 5/1982 | Morehouse et al. | 360/106 |
| 4,544,972 | 10/1985 | Kogure et al. | 360/105 |
| 4,544,973 | 10/1985 | VanDeBult | 360/106 |
| 4,635,151 | 1/1987 | Hazebrouck | 360/105 |
| 4,639,863 | 1/1987 | Harrison et al. | 360/97 X |
| 4,652,779 | 3/1987 | Wilcox | 310/13 |
| 4,654,735 | 3/1987 | Izraelev et al. | 360/104 |
| 4,689,703 | 8/1987 | Olbrich et al. | 360/104 |
| 4,707,754 | 11/1987 | Patel et al. | 360/106 |

FOREIGN PATENT DOCUMENTS 57-191879 11/1982 Japan .................................. 360/104
59-227077 12/1984 Japan .................................. 360/98

OTHER PUBLICATIONS

Strain-Free Magnet Clamp for Swinging Arm Actuator, IBM Technical Disclosure Bulletin, vol. 24, No. 12, May 1982, D. J. Smith (pp. 6236–6237).
Design of A Swinging Arm Actuator for a Disk File, IBM J. Res. Develop., J. S. Heath, pp. 389–397 (Jul. 1976).

Primary Examiner—John H. Wolff
Attorney, Agent, or Firm—Lowe, Price, Leblanc, Becker & Shur

[57] ABSTRACT

A head actuator for a disk drive is provided with a structural body integrally formed by a housing portion for rotatably supporting a moving part formed by a head for writing/reading data in/from a disk and a coil fixed therewith and a yoke portion for interlinking magnetic flux with the coil, which structural body is fixed to a base portion. By virtue of such structure, the resonance point of a vibration system of the head actuator can be increased in frequency thereby to stably and correctly locate the head on the disk. The structural body and base portion mount to each other on the surfaces which are substantially coplanar with the center of gravity and head arm direction of movement.

7 Claims, 14 Drawing Sheets

DISK DRIVE HEAD ACTUATOR AND MOUNTING ARRANGEMENT THEREFOR

BACKGROUND OF THE INVENTION

1. Field of the Invention

The present invention relates to a head actuator for a disk drive, which is adapted to locate a head on a disk for writing/reading data in/from the disk.

2. Description of the Prior Art

FIG. 1 illustrated system structure of a conventional magnetic head actuator for a disk drive mounted on a magnetic disk unit, FIG. 2 is a perspective view showing an example of the magnetic head actuator and FIG. 3 is a sectional view taken along the line III—III in FIG. 2. Referring to FIGS. 1, 2 and 3, numeral 1 indicates a magnetic disk, numeral 2 indicates a magnetic head positioned on the magnetic disk 1 for writing/reading data in/from the magnetic disk 1 and numeral 3 indicated a slider provided with the magnetic head 2. The slider 3 is made buoyant through air flow caused by rotation of the magnetic disk 1, to float the magnetic head 2 on the magnetic disk 1. Numeral 4 indicates a gimbal spring for supporting the slider 3, which gimbal spring 4 is fixed to an arm 5. Numeral 6 indicates a rotary shaft for making the arm 5 rotatable within a prescribed range, numeral 7 indicates a housing for supporting the rotary shaft 6, numeral 8 indicates a bearing provided between the housing 7 and the rotary shaft 6 for smoothly rotating the rotary shaft 6 and numeral 9 indicates a coil mounted on the rotary shaft 6 oppositely to the arm 5. The arm 5, the coil 9 and the rotary shaft 6 define a moving part 10. Numeral 11 indicates a magnet for causing magnetic flux and numeral 12 indicates a yoke forming a magnetic path for interlinking the magnetic flux with the coil 9. The yoke 12 is in an E-shaped configuration, and the bottom portion thereof is fixed to the housing 7 by a plurality of screws. The housing 7 is fixed to a base portion 13 by a plurality of screws. The housing 7, the magnet 11, the yoke 12 and the base portion 13 define a fixed part 14. Numeral 15 indicates a control system for performing such control that the magnetic head 2 is located in a prescribed position on the magnetic disk 1.

In order to write/read data in/from the magnetic disk 1 in the conventional magnetic head actuator of the aforementioned structure, the magnetic head 2 must be retained at the prescribed position on the magnetic disk 1 until the operation is completed. In such reading/writing operation, however, the aforementioned respective components of the magnetic head actuator vibrate at various frequencies. The scope of frequencies is quite large, ranging from a low level such as thermal deformation through decentering $\Delta x_2$ (FIG. 1) of the magnetic disk 1 in rotation up to vibration $\Delta x_3$ (FIG. 1) of several hundred Hz originating in the rotary shaft 6 and its bearing. Therefore, relative displacement x ($x = \Sigma \Delta x_i$) having a wide frequency response is caused between the magnetic disk 1 and the magentic head 2. Thus, movement of the magnetic head 2 must follow the relative displacement x in order to read/write data through the magnetic head 2. In other words, difference x−y (hereinafter referred to as follow-up error e) between movement y of the magentic head 2 and the relative displacement x must be zero.

In order to eliminate the follow-up error e, a current flows from the control system 15 to the coil 9. When, for example, a current $i_1$ flows to the coil 9 as shown by arrows in FIG. 3, electromagnetic force is provided on the coil 9 by the magnetic flux interlinked therewith and the current $i_1$, whereby the coil 9 is displaced in the direction A as shown in FIG. 2 in response to the current strength. Therefore, the arm 5 is displaced in the direction R with the displacement of the coil 9. The magnetic coil 2 can be located in the prescribed position on the magnetic disk 1 by such control.

In the aforementioned conventional magnetic head actuator, however, vibration of the housing 7 as shown by arrows in FIG. 4A and that of the yoke 12 as shown by arrows in FIG. 4B are provided in a coupled manner in head actuation to reach a resonance point of the vibration system of the magnetic head actuator, whereby the magnetic head cannot be correctly located in the prescribed position.

SUMMARY OF THE INVENTION

An object of the present invention is to provide a head actuator for disk drive in which a resonance point of a vibration system is increased in frequency in comparison with the conventional head actuator to substantially prevent resonance of vibration caused in head actuation, thereby to correctly and accurately locate a head in a prescribed position.

The head actuator for a disk drive according to the present invention comprises a moving part formed by an arm provided with a head for writing/reading data in/from a disk and a coil fixed with the same, a structural body integrally formed by a housing portion for rotatably supporting the moving part and a yoke portion for interlinking magnetic flux with the coil and a base portion to which the structural body is fixed. The head actuator according to the present invention is increased in rigidity in comparison with the conventional head actuator in which the housing portion and the yoke portion are separately provided, whereby the resonance point of the vibration system is increased in frequency. Therefore, even if the housing portion and the yoke portion vibrate in a coupled manner in head actuation, the coupled vibration is substantially prevented from reaching the frequency level of the resonance point, in contrast to the conventional head actuator. Thus, the head actuator for a disk drive according to the present invention can locate a head in a prescribed position more stably and correctly in comparison with the conventional head actuator.

Further, the housing portion is fixed to the base portion on a plane passing through the center of gravity of the moving part and including the direction of movement of the moving part or in the vicinity thereof, whereby the head actuator is further improved in rigidity to stably and correctly locate the head in the prescribed position.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
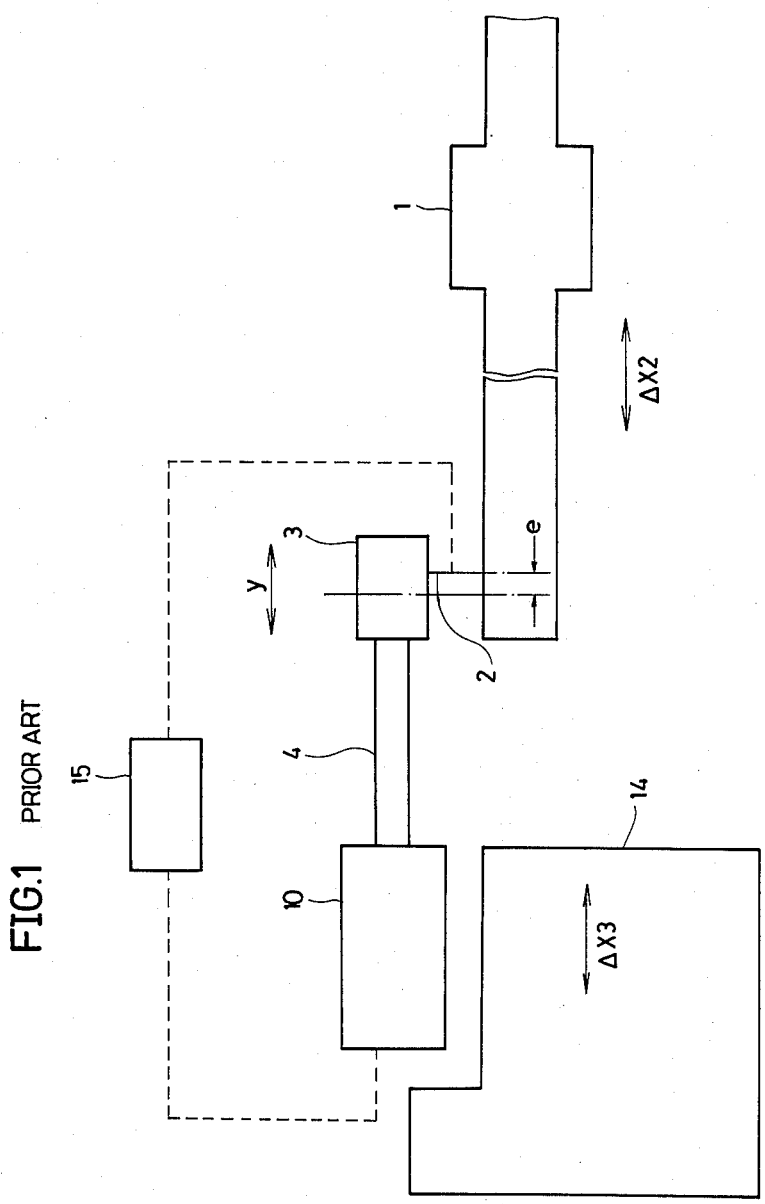
FIG. 1 illustrates system structure of a conventional magnetic actuator for disk drive.
Figure 2:
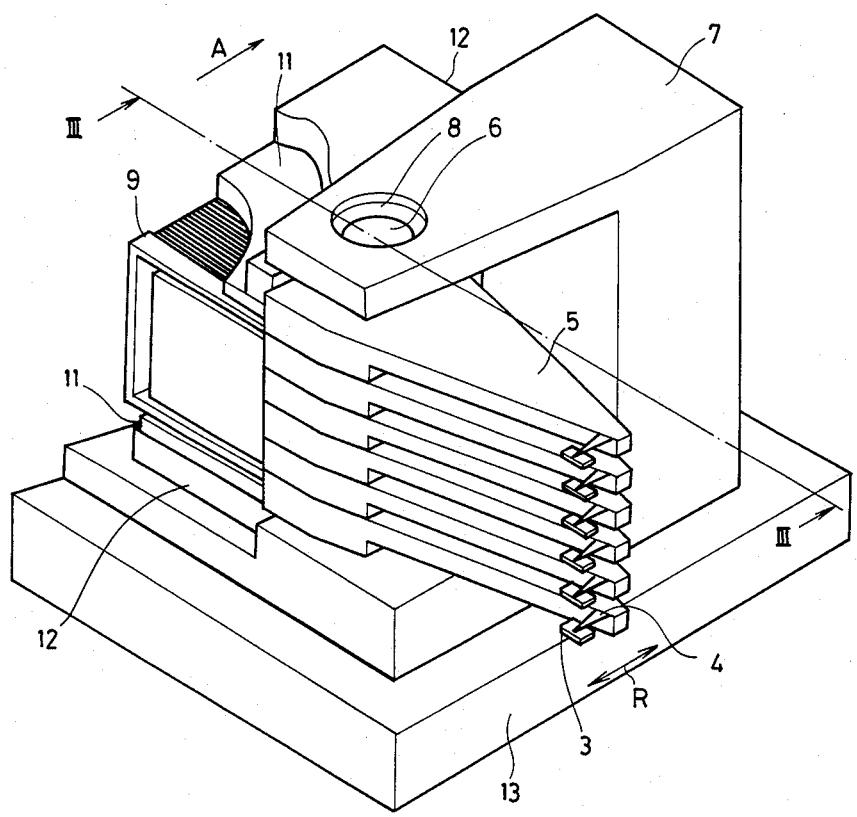
FIG. 2 is a perspective view showing the conventional magnetic head actuator.
Figure 3:
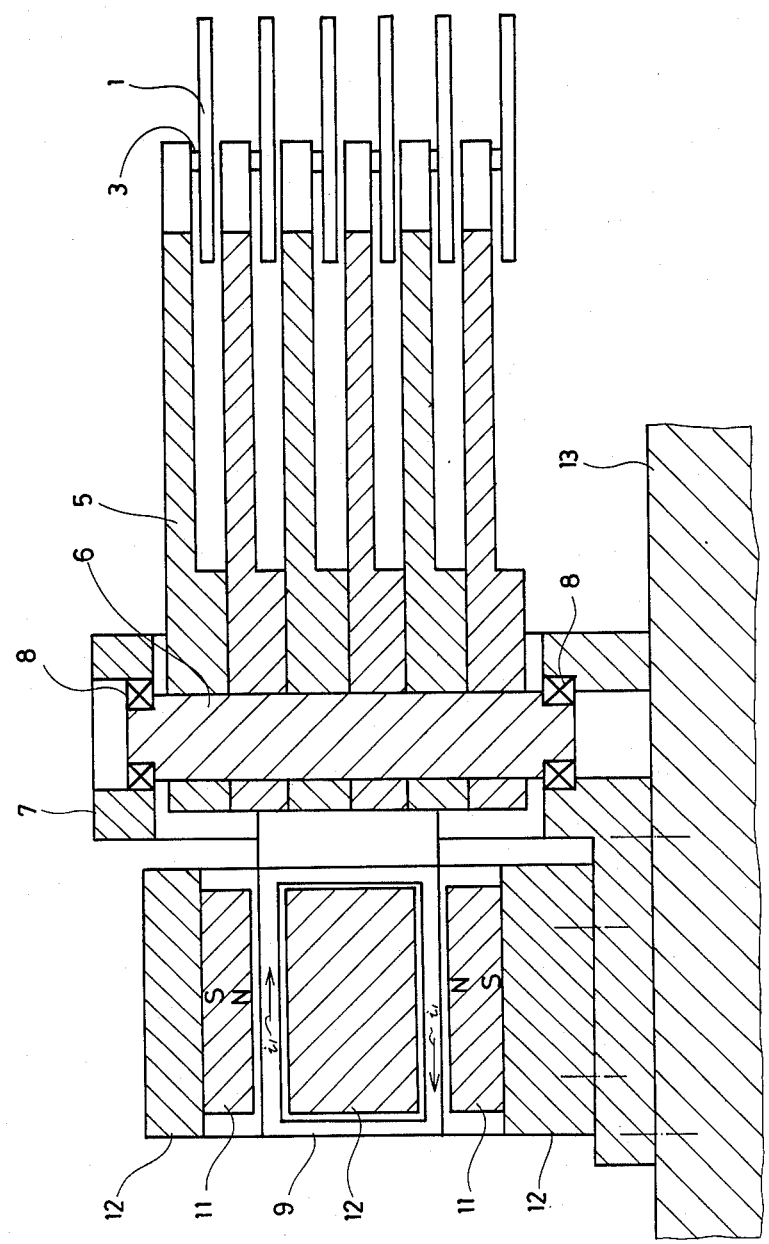
FIG. 3 is a sectional view taken along the line III—III in FIG. 2.
Figure 4A:
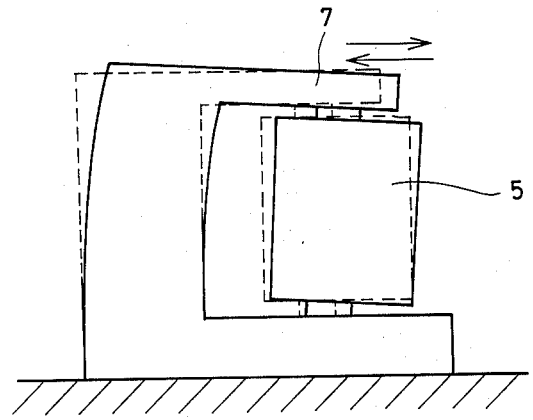
FIG. 4A illustrates vibration of a housing of the conventional head actuator in head actuation.
Figure 4B:
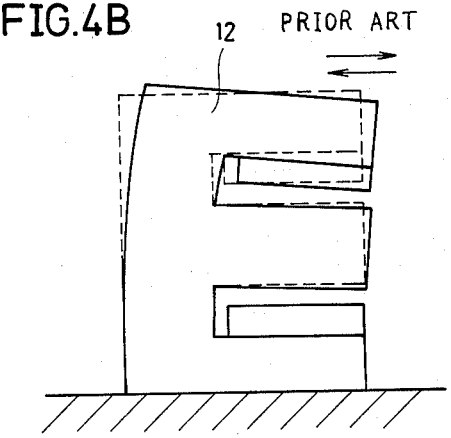
FIG. 4B illustrates vibration of a yoke of the conventional head actuator in head actuation.
Figure 5:
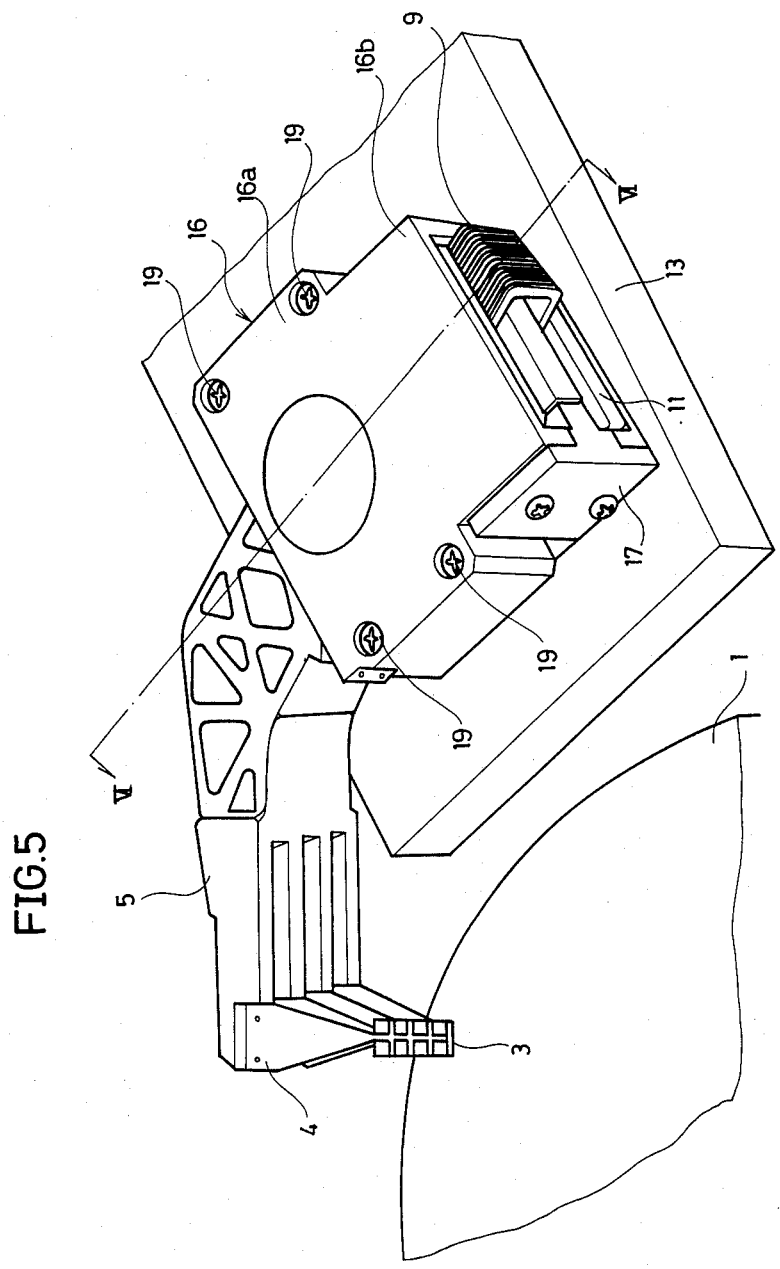
FIG. 5 is a perspective view showing a magnetic head actuator for a disk drive according to an embodiment of the present invention.
Figure 6:
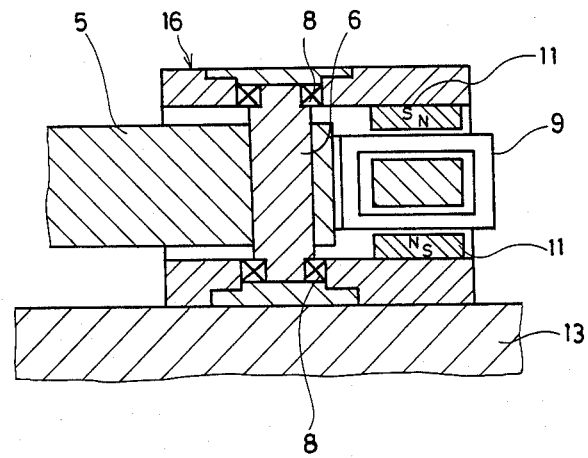
FIG. 6 is a sectional view taken along the line VI—VI in FIG. 5.
Figure 7:
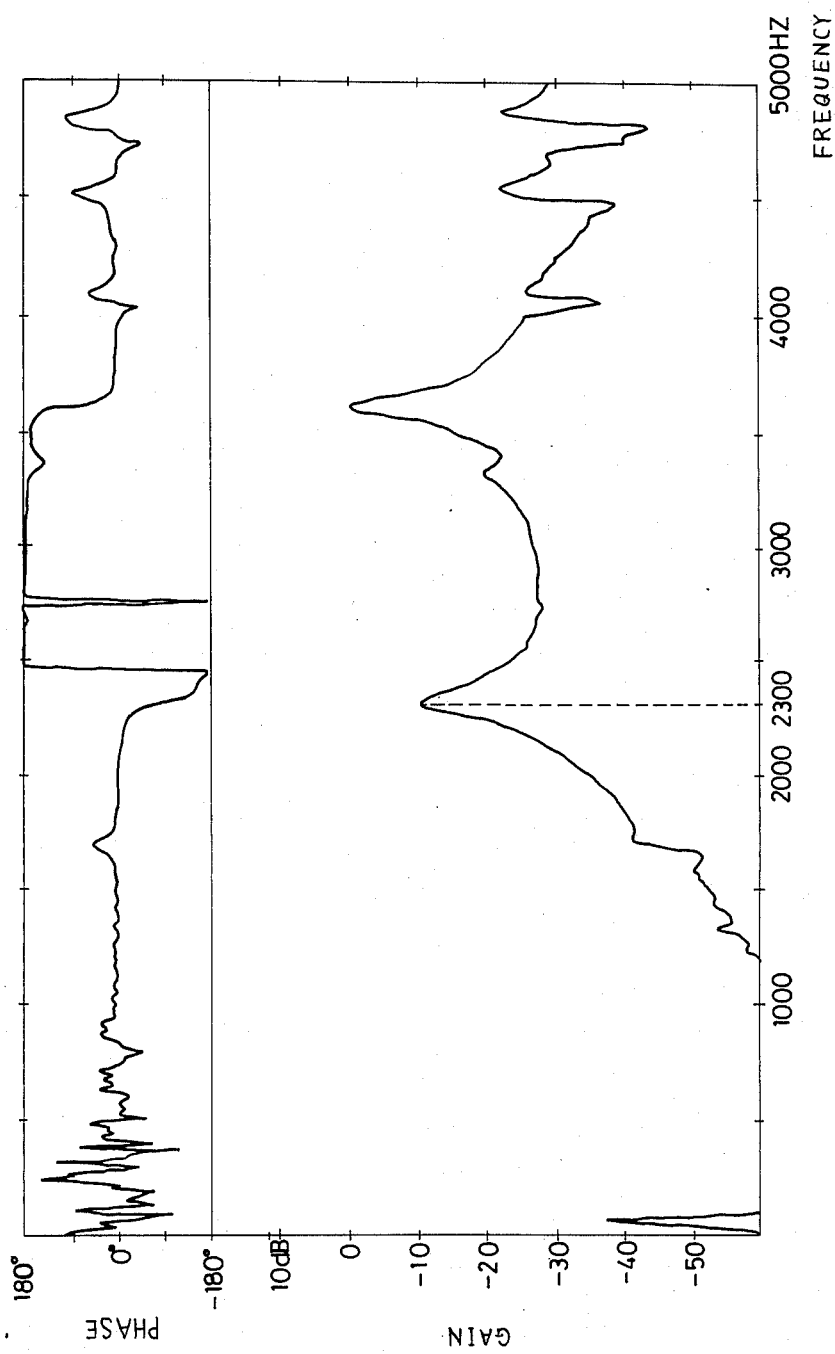
FIG. 7 is a characteristic diagram showing the frequency response of the embodiment as shown in FIG. 5.

FIG. 5 is a perspective view showing a magnetic head actuator for disk drive according to an embodiment of the present invention, and FIG. 6 is a sectional view taken along the line VI—VI in FIG. 5. Referring to FIGS. 5 and 6, numeral 1 indicates a magnetic disk, numeral 3 indicates a slider, numeral 4 indicates a gimbal spring, numeral 5 indicates an arm, numeral 6 indicates a rotary shaft, numeral 8 indicates a bearing, numeral 9 indicates a coil, numeral 11 indicates a magnet and numeral 13 indicates a base portion. Numeral 16 indicates a structural body integrally formed by the yoke and the housing of the conventional magnetic head actuator, and numeral 16a indicates a housing portion and numeral 16b indicates a yoke portion. The structural body 16 is fixed to the base portion 13 by a plurality of screws 19. Numeral 17 indicates a cap mounted on the structural body 16 after the coil 9 is inserted in the yoke portion 16b of the structural body 16, to form a magnetic path. This cap 17 is screwed on the structural body 16. The magnetic head actuator in the aforementioned structure shows such a frequency response as shown in FIG. 7 in head actuation. Referring to FIG. 7, the abscissa indicates the frequency, and the ordinate indicates the gain and phase of output (acceleration) with respect ot input (force). It has been recognized that the first resonance point of the vibration system of the magnetic head actuator according to this embodiment is at a frequency of about 2300 Hz, which is higher than that of 1700 to 2000 Hz of the resonance point of the vibration system of the conventional magnetic head actuator. Thus, the vibration frequency of the structural body 16 or the like will not easily reach the frequency level of the resonance point, whereby the magnetic head can be stably and correctly located in the prescribed position in contrast to the conventional magnetic head actuator.

Figure 8:
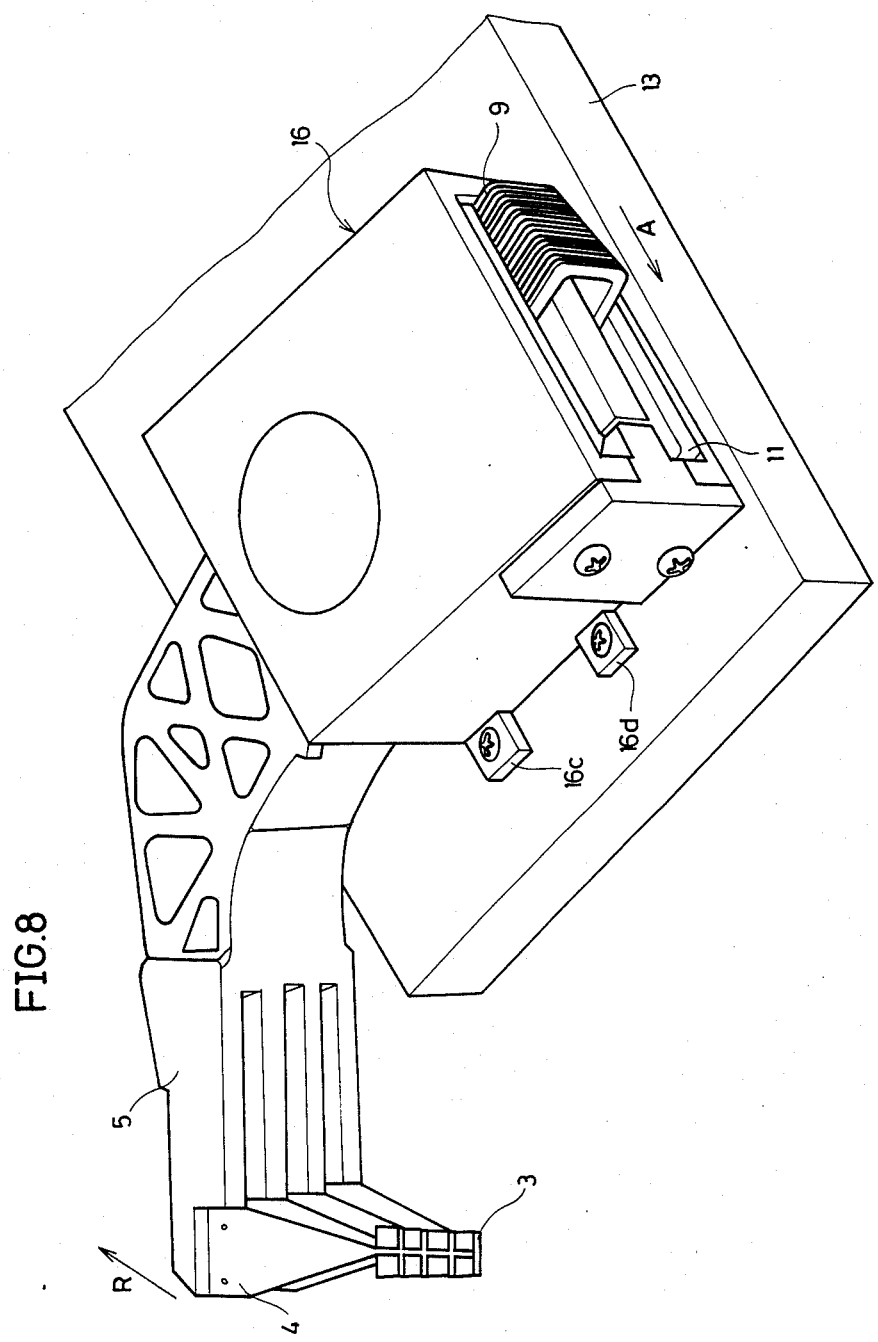
FIG. 8 is a perspective view showing another embodiment of the present invention.
Figure 9:
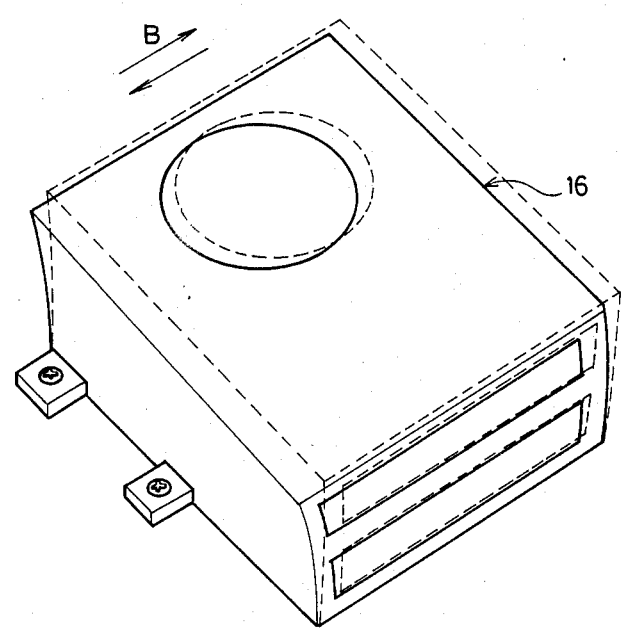
FIG. 9 is a state diagram showing vibration of the embodiment as shown in FIG. 8.
Figure 10:
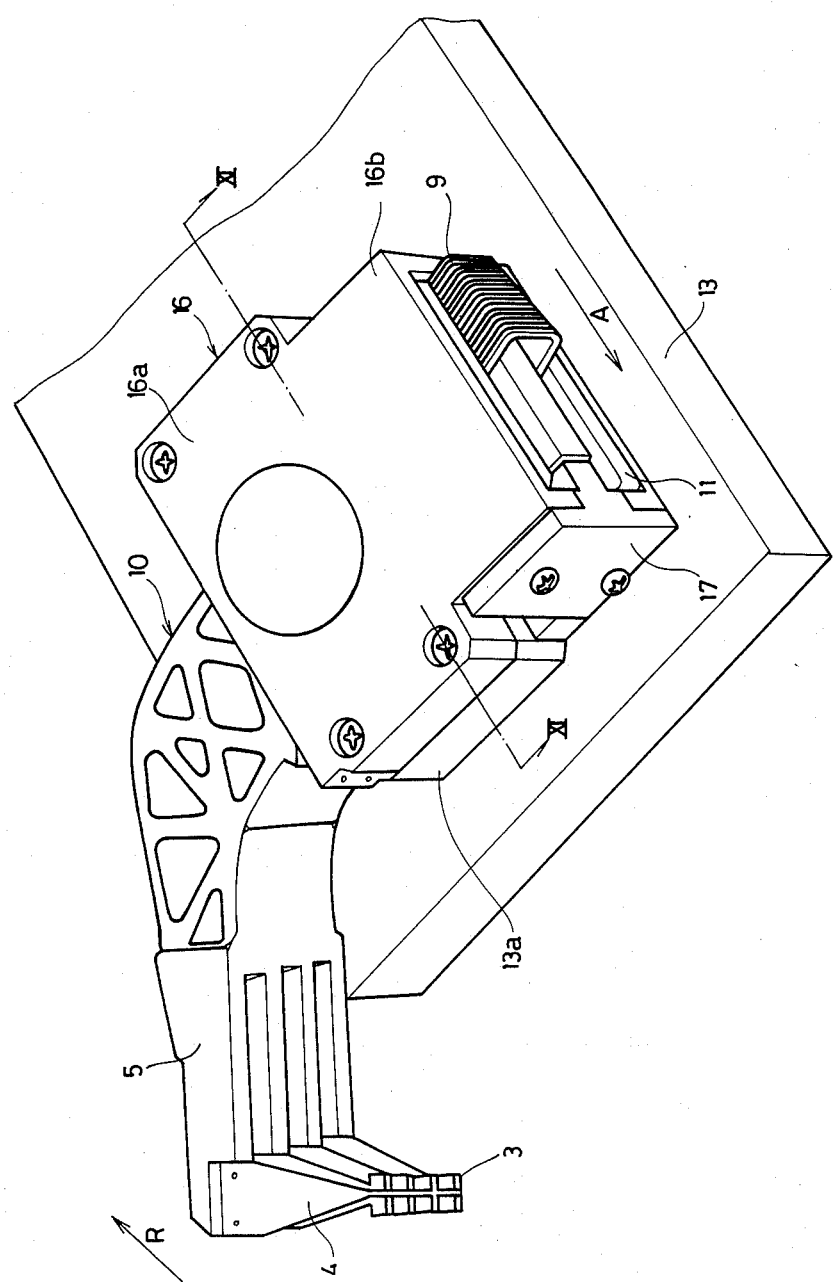
FIG. 10 is a perspective view showing still another embodiment of the present invention.
Figure 11:
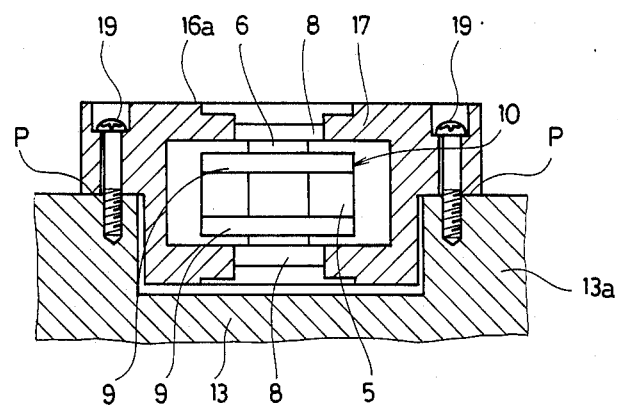
FIG. 11 is a sectional view taken along the line XI—XI in FIG. 10.

The structural body 16 may be provided in its bottom portion with pawls 16c and 16d as shown in FIG. 8, to be fixed to the base portion 13. In this case, however, the structural body 16 is caused to vibrate along the direction B as shown in FIG. 9 in head actuation. FIG. 10 is a perspective view showing a magnetic head actuator according to another embodiment of the present invention, which can prevent such vibration. FIG. 11 is a sectional view taken along the line XI—XI in FIG. 10. In this embodiment, a projection 13a is provided on a base portion 13 in order to fix a housing portion 16a of a structural body 16 to the base portion 13 in the vicinity of a plane P passing through the center of gravity of a moving part 10 and including the direction (arrow A or R in FIG. 10) of movement of the moving part 10. The magnetic head actuator of such structure can prevent the structural body 16 from vibration in the direction B as shown in FIG. 9.

Figure 12:
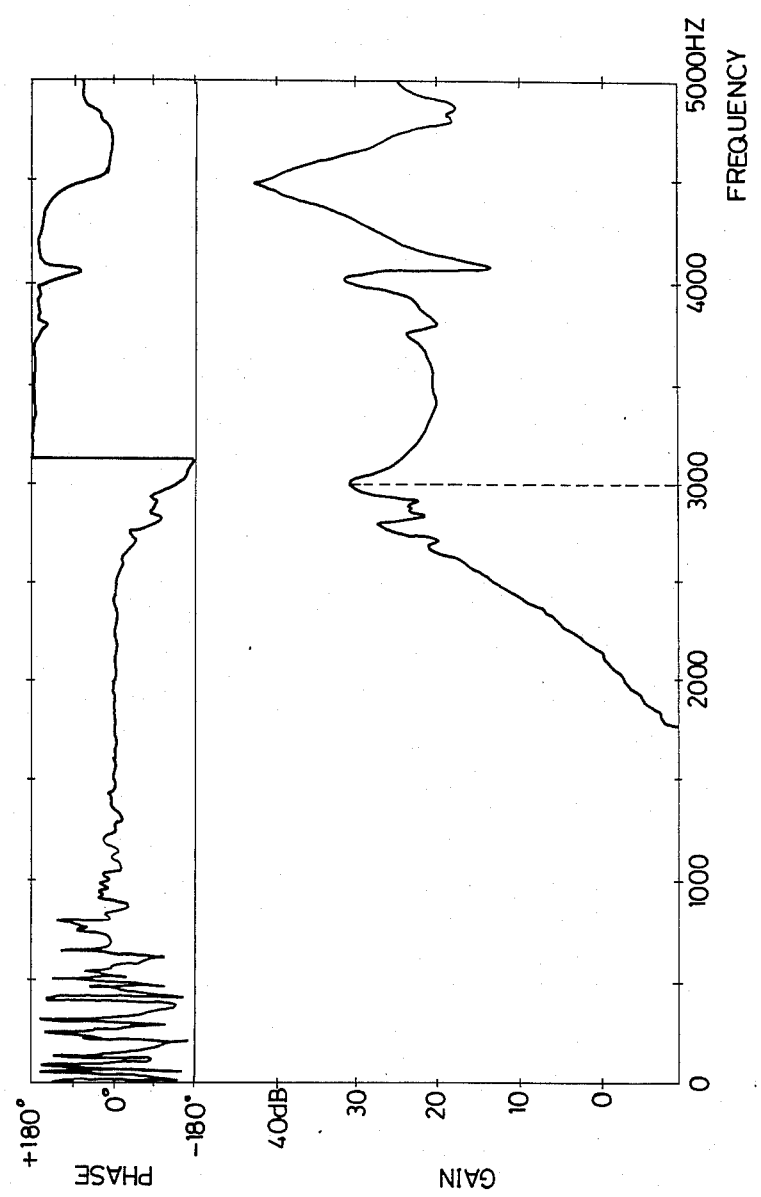
FIG. 12 is a characteristic diagram showing the frequency response of the embodiment as shown in FIG. 10.

FIG. 12 illustrates the frequency response characteristic of the embodiment as shown in FIG. 10. As obvious from the vibration characteristic shown in FIG. 12, the first resonance point of the vibration system in this embodiment is further increased in frequency to about 3000 Hz. Thus, the magnetic head can be further stably and correctly located in the prescribed position.

Figure 13A:
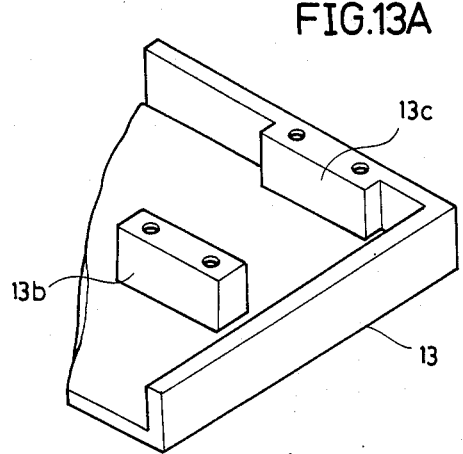
FIG. 13A is a perspective view showing modifications of a base portion provided with one projection on the side wall for implementing the embodiment as shown in FIG. 10.
Figure 13B:
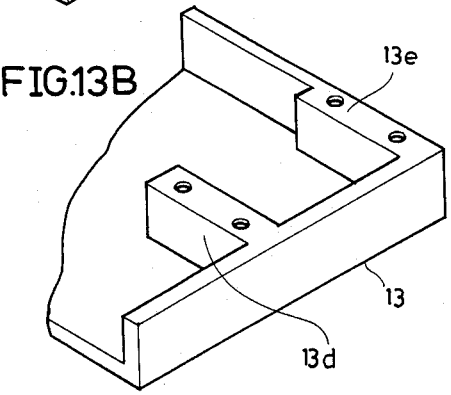
FIG. 13B is a perspective view showing modifications of a base portion provided with two projections on the side wall for implementing the embodiment as shown in FIG. 10.
Figure 14:
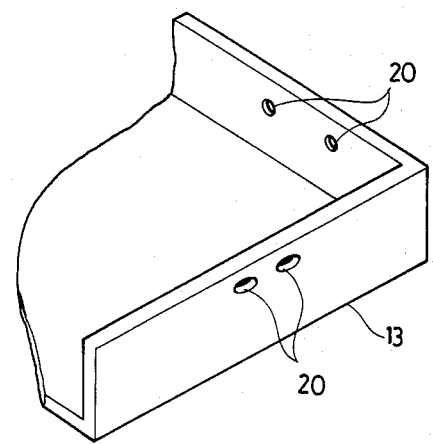
FIG. 14 is an enlarged perspective view showing a base portion provided with tapped holes.

Although the base portion 13 is provided with the projection 13a in this embodiment, the base portion 13 may be in the form of a box as shown in FIG. 13A to be provided with a projection 13b on its bottom and another projection 13c on its side wall for fixing a housing portion 16a. Alternatively, projections 13d and 13e may be formed on the side wall of a box-shaped base portion 13 as shown in FIG. 13B. Further, as shown in FIG. 14, a base portion 13 in the form of a box may provided with tapped holes 20 for fixing the housing portion 16a on its side walls, so that the housing portion 16a is screwed on the base portion 13 through the tapped holes 20. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A head actuator for a disk drive, comprising:
   (a) a base portion having an upward facing support surface;
   (b) shaft means projecting upwardly from the support surface of the base portion for rotatably supporting (1) at least one arm carrying a head means adapted to be positioned on a magnetic disk for writing and reading data and (2) a coil mounted to said shaft means;
   (c) housing means mounted to the base portion for rotatably supporting said shaft means to enable movement of the arm and said head means and said coil in relation to the base portion and housing means, said housing means including a yoke of integral unitary construction therewith and magnet means connected with the yoke for inducing magnetic flux within the yoke and coil;

said shaft means and said at least one arm and said head means and coil having a center of gravity spaced above the support surface and constituting a movable component tending to induce vibration within said head actuator;

said base portion including projection means extending upwardly from the support surface to define a mounting surface contacting the housing means to provide support for the housing means in substantially a plane of support extending substantially through said center of gravity in a direction substantially parallel to said at least one arm;

(d) means for fastening the base portion to the housing means;

whereby mounting and fastening of said housing means to the base portion along said plane of support increases a resonance frequency of a first resonance point of said head actuator to minimize vibration during operation of the movable component in relation to mounting and fastening of said housing means to the base portion in a plane other than said plane of support, wherein said projection means is of integral unitary construction with the base portion and includes a plurality of projections extending upwardly from the base portion to define a plurality of said mounting surfaces lying substantially in said plane of support, and wherein said housing means has a peripheral portion having a downward facing step adapted to overlie and contact said mounting surfaces; and said fastening means includes screw means extending through said peripheral portion into the projections through said mounting surfaces.

2. A head actuator for a disk drive, comprising:
(a) a base portion having an upward facing support surface;
(b) shaft means projecting upwardly from the support surface of the base portion for rotatably supporting (1) at least one arm carrying a head means adapted to be positioned on a magnetic disk for writing and reading data and (2) a coil mounted to said shaft means;
(c) housing means mounted to the base portion for rotatably supporting said shaft means to enable movement of the arm and said head means and said coil in relation to the base portion and housing means, said housing means including a yoke of integral unitary construction therewith and magnet means connected with the yoke for inducing magnetic flux within the yoke and coil;
said shaft means and said at least one arm and said head means and coil having a center of gravity spaced above the support surface and constituting a movable component tending to induce vibration within said head actuator;
said base portion including projection means extending upwardly from the support surface to define a mounting surface contacting the housing means to provide support for the housing means in substantially a plane of support extending substantially through said center of gravity in a direction substantially parallel to said at least one arm;
(d) means for fastening the base portion to the housing means;
whereby mounting and fastening of said housing means to the base portion along said plane of support increases a resonance frequency of a first resonance point of said head actuator to minimize vibration during operation of the movable component in relation to mounting and fastening of said housing means to the base portion in a plane other than said plane of support, wherein said base portion is boxshaped and includes side walls and a bottom wall, wherein said projection means includes a pair of projections extending from the bottom wall, at least one projection being integral with at least one side wall.

3. A head actuator for a disk drive, comprising:
(a) a base portion having an upward facing support surface;
(b) shaft means projecting upwardly from the support surface of the base portion for rotatably supporting (1) at least one arm carrying a head means adapted to be positioned on a magnetic disk for writing and reading data and (2) a coil mounted to said shaft means;
(c) housing means mounted to the base portion for rotatably supporting said shaft means to enable movement of the arm and said head means and said coil in relation to the base portion and housing means, said housing means including a yoke of integral unitary construction therewith and magnet means connected with the yoke for inducing magnetic flux within the yoke and coil;
said shaft means and said at least one arm and said head means and coil having a center of gravity spaced above the support surface and constituting a movable component tending to induce vibration within said head actuator;
said base portion including projection means extending upwardly from the support surface to define a mounting surface contacting the housing means to provide support for the housing means in substantially a plane of support extending substantially through said center of gravity in a direction substantially parallel to said at least one arm;
(d) means for fastening the base portion to the housing means;
whereby mounting and fastening of said housing means to the base portion along said plane of support increases a resonance frequency of a first resonance point of said head actuator to minimize vibration during operation of the movable component in relation to mounting and fastening of said housing means to the base portion in a plane other than said plane of support, wherein said mounting surfaces formed in said projections have tapped holes to receive the fastening means.

4. A head actuator for a disk drive, comprising:
(a) a base portion having an upward facing support surface;
(b) shaft means projecting upwardly from the support surface of the base portion for rotatably supporting (1) at least one arm carrying a head means adapted to be positioned on a magnetic disk for writing and reading data and (2) a coil mounted to said shaft means;
(c) housing means mounted to the base portion for rotatably supporting said shaft means to enable movement of the arm and said head means and said coil in relation to the base portion and housing means, said housing means including a yoke of integral unitary construction therewith and magnet means connected with the yoke for inducing magnetic flux within the yoke and coil;
said shaft means and said at least one arm and said head means and coil having a center of gravity spaced above the support surface and constituting a movable component tending to induce vibration within said head actuator;

said base portion including projection means extending upwardly from the support surface to define a mounting surface contacting the housing means to provide support for the housing means in substantially a plane of support extending substantially through said center of gravity in a direction substantially parallel to said at least one arm;

(d) means for fastening the base portion to the housing means;

whereby mounting and fastening of said housing means to the base portion along said plane of support increases a resonance frequency of a first resonance point of said head actuator to minimize vibration during operation of the movable component in relation to mounting and fastening of said housing means to the base portion in a plane other than said plane of support.

5. The head actuator of claim 4, wherein substantially entirely all mating faces of the housing means and base portion including said mounting surface are substantially coplanar with said plane of support.

6. The head actuator of claim 4, wherein said shaft means is supported by a layer of ball bearing races press-fitted to outermost ends of said shaft means to maximize the distance between the races to thereby improve rigidity of the shaft and prevent tilting of the shaft.

7. The head actuator of claim 4, wherein said head means is a magnetic head.

* * * * *